United States Patent [19]
Hollins

[11] 3,827,792
[45] Aug. 6, 1974

[54] RESILIENT TIRE AND WHEEL ASSEMBLY

[76] Inventor: Jesse R. Hollins, 1 Chester Dr., Great Neck, N.Y. 11021

[22] Filed: Mar. 24, 1972

[21] Appl. No.: 237,649

[52] U.S. Cl.............. 152/319, 152/381, 152/382, 152/398, 152/403
[51] Int. Cl........ B60c 7/08, B60c 7/24, B60c 19/00
[58] Field of Search .......... 152/310, 311, 312, 313, 152/315, 316, 318, 319, 379, 380, 381, 382, 384, 396, 397, 398, 401, 402, 403; 152/319, 381, 382, 398, 403

[56] References Cited
UNITED STATES PATENTS

| | | | |
|---|---|---|---|
| 888,906 | 5/1908 | Jordan | 152/402 X |
| 957,413 | 5/1910 | Constantin | 152/379 X |
| 1,022,127 | 4/1912 | Dettelbach | 152/398 |
| 2,678,675 | 5/1954 | Crowder | 152/315 X |

Primary Examiner—M. Henson Wood, Jr.
Assistant Examiner—Howard Beltran

[57] ABSTRACT

An improved resilient tire combination comprising a wheel assembly which is adapted to be mounted on a vehicle wheel hub. The complete tire is formed with an inner core and an outer carcass where interengaging cavities and projections prevent relative rotation between said inner core and outer carcass with bolts provided for securing the complete tire to said wheel assembly.

3 Claims, 10 Drawing Figures

PATENTED AUG 6 1974

3,827,792

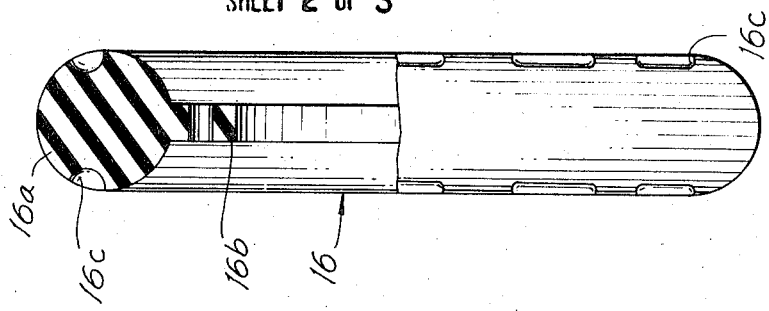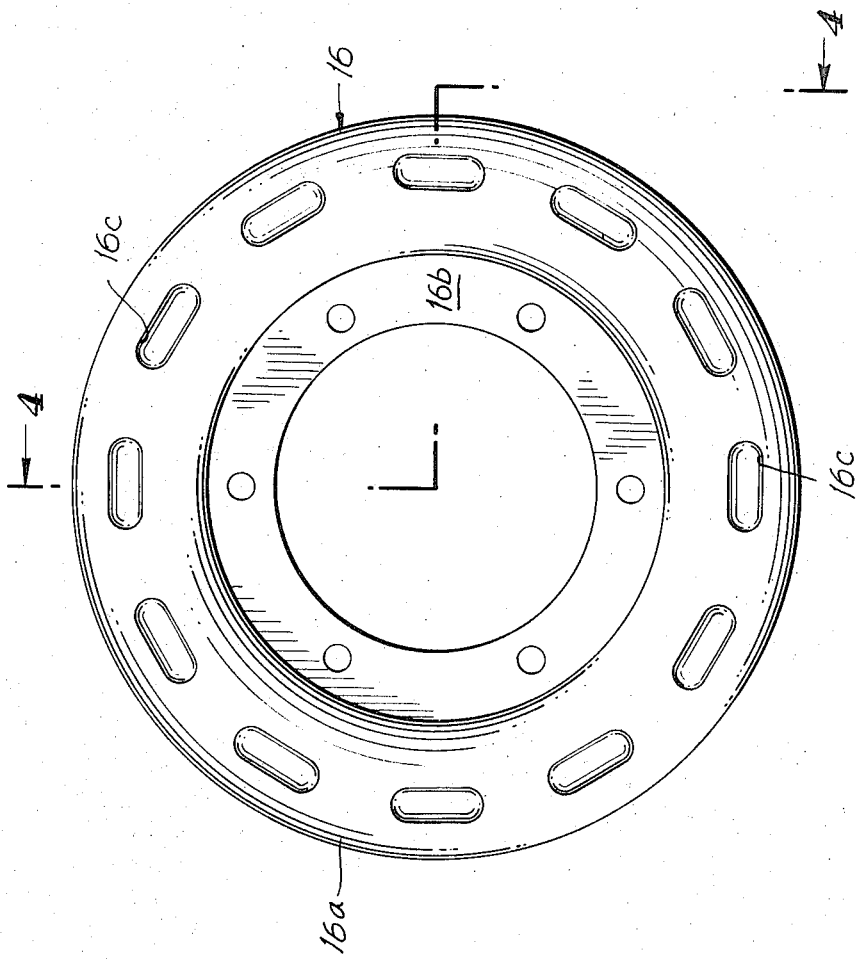

RESILIENT TIRE AND WHEEL ASSEMBLY

BACKGROUND OF THE INVENTION

1. Field of the Invention

Airless vehicle tire

2. Description of the Prior Art

Nearly all motor vehicles utilize air-filled tires, some of which include a tube. Air-filled tires (the use of this term hereinafter refers to tubeless and tube tires) have created severe problems since their inception. The most severe problem of using an air-filled tire is the fact that said tire is susceptible to being punctured, causing rapid deflation. If the vehicle upon which the tire is mounted is in motion, the sudden deflation of one tire can cause severe safety problems. Very frequently, if the vehicle is moving relatively fast, the sudden deflation of a tire can cause the operator of the vehicle to lose control over the same which results in an inherently dangerous situation. Even if the vehicle is moving at a relatively slow speed, it is still extremely difficult for the driver to maintain control thereover if one of the tires on the vehicle suddenly deflates.

Many times if the vehicle is in motion and the tire suddenly deflates said tire disengages from the rim upon which it is mounted. This obviously presents an extremely dangerous situation since it is then very difficult for the driver to maneuver the vehicle to an area of safety.

In addition to the safety hazards above noted from having a tire suddenly delfate, the labor involved in changing a flat tire is quite substantial and usually at the least involves taking a spare from a vehicle storage area (such as the trunk in a car), jacking up the vehicle, removing the wheel with the defective tire and replacing the same with the spare wheel and tire. Many drivers, such as women, are unable to perform this chore since it requires a substantial amount of physical strength. A further difficulty in changing a tire is that often times the jack and equipment for performing this task are not functional by reason of some of the component parts thereof being missing.

The prior art has recognized the inherent problems in using air-filled tires and has attempted to overcome them. One prior art approach involved installing a wheel of rigid material or of a resilient material inside the tire carcass which was intended to maintain the vehicle's ability to continue to be operable within certain limitations if the carcass were suddenly pierced. With many of these prior art tires no means was provided for preventing the material inside the tire carcass from moving relative to the carcass and such relative movement was undesirable in that it resulted in friction between the carcass and said material. This decreased the operational life of the tire and also was undesirable in that it resulted in tire instability. These prior art tires were used only on slow-moving vehicles in the road construction industry and were thus of limited use.

SUMMARY OF THE INVENTION

1. Purposes of the Invention

It is, therefore, an object of the present invention to provide an improved tire and wheel combination which overcomes the drawbacks heretofore noted with prior art air and airless tires.

More specifically, it is an object of the present invention to provide an improved airless tire and wheel combination that will overcome the disadvantages heretofore noted with prior art air and airless tires.

Another object of the present invention is to provide an improved airless tire consisting of a carcass with a resilient material within said carcass with means being provided for preventing said resilient material and carcass from moving relative to each other.

Still another object of the present invention is to provide an improved airless tire consisting of a wheel assembly, a carcass and a resilient material contained in said carcass with said aforementioned parts designed so as to facilitate ease of construction and mounting.

A further object of the present invention is to provide a method of constructing an airless tire consisting of a carcass and a resilient material contained in said carcass with said method providing for simple and economical construction of said tire.

2. Brief Description of the Invention

In accordance with the present invention the foregoing and other objects are achieved by providing a wheel assembly consisting of two sections. In one aspect of the present invention the two sections which comprise the wheel assembly mate with each other and each includes a central hub. Each wheel section includes a carcass receiving portion adjacent its periphery.

An annular resilient inner tire is provided and includes a series of cavities located on its sides. Positioned about said inner tire is an outer tire (carcass) which normally is molded about the inner tire and includes projections which fill the cavities of said inner tire. The combined outer and inner tire is locked between the wheel sections. Bolt holes are provided through the inner and outer tires and bolts are secured to one wheel section, extend through the bolt holes in the inner and outer tire and through openings in the other wheel section where they are secured by nuts to bolt the wheel sections to each other.

The tire and wheel assembly are secured to a vehicle axle and for this purpose registered locating pin and bolt holes are provided on the wheel sections so that the tire assembly can be secured to the vehicle axle.

It should be noted that by having cavities on the inner tire with the outer tire having projections which fill said cavities relative movement between the inner and outer tires is prevented overcoming a difficulty that plagued the prior art airless tires of the type herein described.

Other embodiments of the present invention are hereinafter described in detail.

BRIEF DESCRIPTION OF THE DRAWINGS

In the drawings:

FIG. 3 is a side view of the inner tire and wheel assembly of the present invention;

FIG. 4 is a sectional view taken substantially along the line 4—4 of FIG. 3.

DESCRIPTION OF THE PREFERRED EMBODIMENTS

Figure 2:
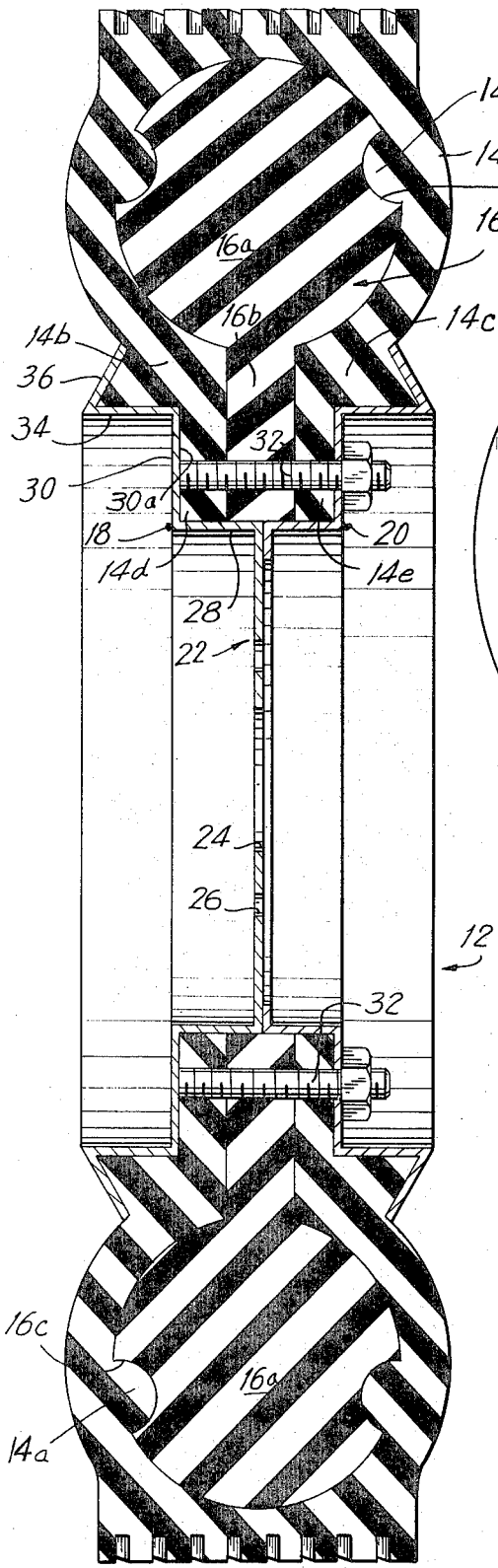
FIG. 2 is an enlarged sectional view taken substantially along the line 2—2 of FIG. 1.
Figure 1:
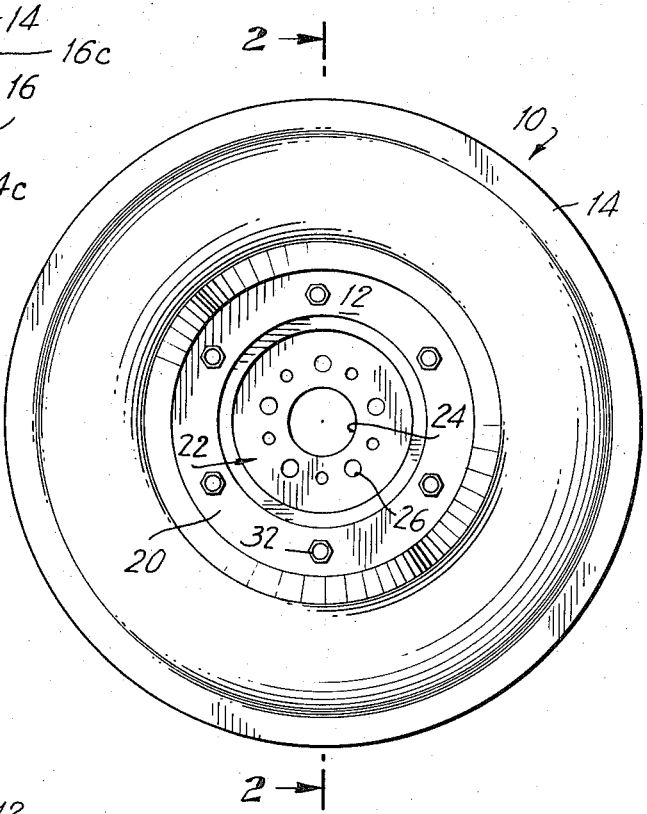
FIG. 1 is a side view of a tire construction according to the present invention.

In the drawings, an airless tire 10, according to the present invention, is shown and consists of a wheel assembly 12, an outer tire (carcass) 14 and an inner tire 16 which together comprise the complete tire. Wheel assembly 12 is formed from wheel sections 18 and 20 which, in the embodiment of the invention shown in FIGS. 1 and 2, are substantial duplicates of each other with the differences in said sections hereinafter pointed out. Wheel section 18 includes a central flat hub offset 22, which, as will hereinafter be described, is in contact with a corresponding hub offset of wheel section 20. Located in the center of hub offset 22 is a hub opening 24 which is circular in configuration and serves a purpose that will hereinafter be described. Located symmetrically about hub opening 24 on hub offset 22 are a plurality of locating holes 26 through which the bolt studs and a locating pin of a vehicle wheel assembly project when the tire assembly is mounted.

Extending perpendicularly away from the periphery of hub offset 22 is an annular shoulder 28, the geometrical center of which passes through the center of hub opening 24. Projecting perpendicularly away from the portion of shoulder 28 furthest from hub offset 22 is a tire flank retainer 30 with said tire flank retainer being parallel to offset 22. Secured to inside surface 30a of tire flank retainer 30 are a plurality of bolts 32 with said bolts being symmetrically positioned about hub opening 24. It is to be appreciated that while six bolts have been shown in the drawings this has been done for purposes of illustration and a different number of bolts can be used without departing in any manner from the teachings herein.

Extending perpendicularly away from the outermost portion of tire flank retainer 30 is a rim periphery 34. An annular external inclined bead receiver 36 makes an acute angle with rim periphery 34 and serves a purpose that will soon be readily apparent.

Located on wheel section 20 on the tire flank retainer thereof are a series of bolt holes with the bolt holes arranged so as to be able to receive each of bolts 32 secured to wheel section 18.

In FIGS. 2 and 4 of the drawings the configuration of inner tire 16 is shown and said inner tire is seen to include an annular outer tire filler 16a and a radially inwardly extending section 16b. Annular filler 16a is circular in cross section with radially extending section 16b having flat parallel opposed surfaces. Inner tire 16 can be made of any semi-soft resilient material (as for example polyfoam). Other materials that might be used will be apparent to those skilled in the art or may be developed for the purpose. Located about the side portions of annular section 16a on opposed sides of the inner tire are a plurality of cavities 16c (FIGS. 3 and 4). While a particular configuration for cavities 16c and their location has been shown in the drawings it is to be understood that other configurations and locations can be used if desired. It is also to be appreciated that while 12 cavities have been shown on each opposed side of inner tire 16 that varying numbers of cavities can be used.

Radially extending section 16b defines an annular opening with the inside periphery of said section defining said opening. Preferably, the inside periphery of radially extending section 16b is perpendicular to the parallel opposed faces of said section for a reason that will soon be readily apparent. The same number of bolt openings extend through radially extending section 16b as there are bolts 32 secured to tire retainer 30 and the bolt openings which extend through section 16b are arranged so that a bolt can extend through each of said openings when the tire assembly of the present invention is assembled.

Outer tire 14, which can have a conventional tread, is fabricated around inner tire 16. Outer tire 14 may be made of the same type of rubber which is used to make present day tires although the specific composition of outer tire 14 is not a part of the present invention. Located adjacent the radially innermost portion of the sidewalls of outer tire 14 are opposed outwardly projecting triangularly shaped beads 14b and 14c. Extending radially inwardly from the innermost portion of beads 14b and 14c are spaced apart flanks 14d and 14e that are identical to each other in cross section and which flank radially extending section 16b of the inner tire as will hereinafter be described. The innermost peripheries of each of the radially extending flanks 14d and 14e are in a common circle for a reason that will soon be readily apparent. The same number of bolt holes extend through each of flanks 14d and 14e as there are bolts 32 with said bolt holes arranged so that each different bolt can be passed through registered bolt holes in the inner and outer tire and through a hole in wheel section 20.

Internal stubby projections 14a extend inwardly from outer tire 14 and are arranged in number and location so that each projection fills a separate cavity of inner tire 16.

The preferred method of constructing the inner and outer tires of the present invention consists of making a twosection mold with said sections mating with each other. Each section has a cavity and together produce the inner tire and when the two mold sections are placed face to face on a molding press the cavities of each section define the inner tire cavity. The inner tire cavity is in the shape of a ring and an extended section is provided projecting towards the center of said ring for forming section 16b of the inner tire. The mold section is designed to produce bolt holes on the extended section and cavities on the opposed sides of the inner tire.

Upon completion of molding (and curing if necessary) the inner tire in the aforesaid structure, said inner tire is placed in a mold cavity in the shape of the outer tire. The rubber material of which the outer tire is made is then molded about the inner tire with the projections on the outer tire entering the cavities on the inner tire. Corresponding bolt holes on the inner and outer tire are in registry with each other. Thus, a one piece tire is completed.

In assembling the tire construction of the present invention the complete tire is placed so that each bolt of wheel section 18 passes through one set of registered holes of the inner and outer tire. It is to be appreciated that the bead 14b on the outer tire (FIG. 2) is received in bead receiver 36 with flank 14d of said outer tire resting against inside surface 30a of tire retainer 30. The annular periphery of the tire flank 14d is spaced slightly from shoulder 28 with the left portion of the inner annular periphery of radially extending section 16b of inner tire 16 spaced from shoulder 28 adjacent the tire flank 14d. The next step in the assembly of the tire and wheel assembly of the present invention is to position wheel section 20 so that the bead receiver thereon receives the outer tire bead 14c, flank 14e of the outer tire contacts the inside surface of the tire retainer of wheel section 20 and the inner periphery of tire flank 14e is spaced from the shoulder of wheel section 20. Additionally, the unsupported portion of the inner annular periphery of the radially inwardly extending section of inner tire 16 is slightly spaced from the remaining portion of the shoulder of rim section 20. With this arrangement the wheel section hub offsets contact and the bolts extend through the bolt holes in rim section 20. Nuts secure the free ends of bolts 32 to hold the complete tire between the wheel sections squeezing the inner and outer tire so that the inner peripheries thereof rest against the wheel section shoulders. The tire and wheel assembly can then be mounted on a wheel hub assembly in a conventional manner.

One of the features of the present invention is the forming of cavities on the inner tire and having projections from the outer tire extend thereinto. This, along with having bolts extend through the inner and outer tires, prevents the inner tire from moving relative to the outer tire as frequently occurred with prior art airless tires which included an outer tire and a solid inner tire. Additionally, by having the tire beaded and by providing on the wheel sections annular external inclined bead receivers for securing the beads the outer tire is firmly held so as not to be able to come free from the wheel sections.

Figure 5:
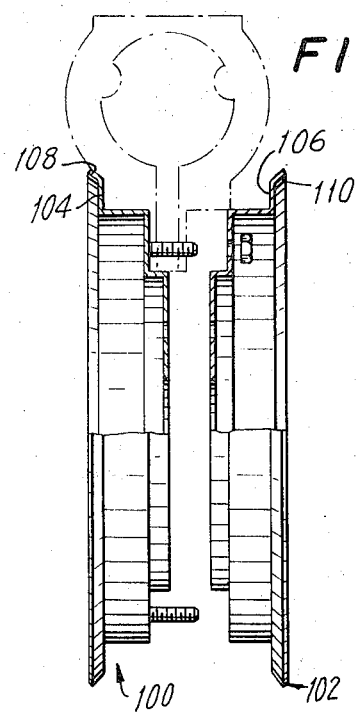
FIGS. 5 through 10 show, in exploded views, different wheel assemblies and tire constructions according to the present invention.

In FIG. 5 of the drawings wheel sections 100 and 102 are shown and are identical to wheel sections 18 and 20 except as hereinafter described. Wheel sections 100 and 102 each include flat radial side wall retainers 104 and 106, respectively, which are parallel to each other when the wheel sections are secured to each other. Annular champfers 108 and 110 are located at the outermost extremity of the side wall retainers of each of the wheel sections and each annular champfer defines an included obtuse angle with its respective side wall retainer. The embodiment of the invention shown in FIG. 5 is designed for an outer tire having a square bead as shown in dotted lines in FIG. 5 in lieu of the triangularly shaped beads shown in FIG. 2. In utilizing the embodiment of the invention shown in FIG. 5 the inner and outer tires are as described in the first embodiment of the invention except that the outer tire side walls do not include an external triangularly shaped bead.

Figure 6:
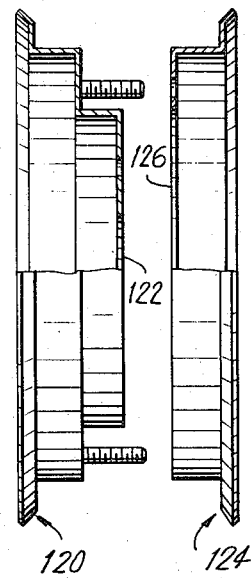

The embodiment of the invention shown in FIG. 6 is intended to use the inner and outer tire shown in FIG. 5 and is identical to the embodiment shown in FIG. 5 except that wheel section 120 has a hub offset 122 about which the inner peripheries of the inner and outer tires are located. Wheel section 124 does not include a hub offset about which any portion of the inner and outer tire peripheries may be placed in abutment with but does include a flat hub section 126 having a central opening and hub assembly bolt holes. In use hub offset 122 abuts against hub section 126 with the wheel sections secured to each other as described in the first embodiment. In the embodiment of the invention shown in FIG. 6 the same type of complete tire is utilized as disclosed in FIG. 5 with the inner peripheries of the inner and outer tire resting against the circumferential shoulder at the periphery of hub offset 122.

Figure 7:
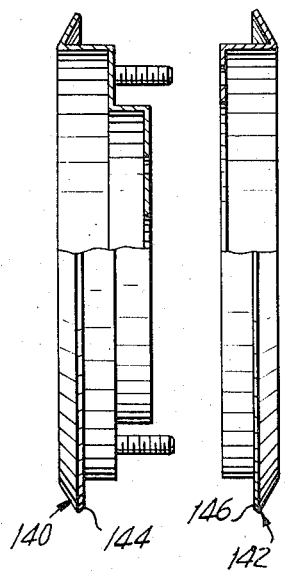

The embodiment of the invention shown in FIG. 7 is identical to that shown in FIG. 6 except that the wheel sections 140 and 142 each include at their outermost periphery an inclined annular bead supporter 144 and 146, respectively. The structure shown in FIG. 7 is designed for use in connection with the complete tire shown in FIG. 2.

Figure 8:
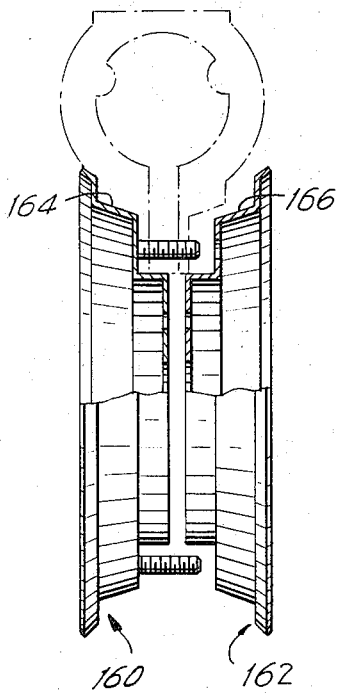

The embodiment of the invention shown in FIG. 8 is identical to that shown in FIG. 5 except that wheel sections 160 and 162 each include an inclined rim periphery 164 and 166, respectively. Rim peripheries 164 and 166 are inclined and define an included obtuse angle with the tire retainer on each section. This is to accommodate an outer tire wherein the portion of the tire adjacent the flanks is inclined towards the side walls as shown in the tire illustrated in dotted lines in FIG. 8. The inner and outer tire arrangement shown in FIG. 8 in dotted lines is identical to that disclosed in the first embodiment except that the outer tire is inclined towards the side walls.

Figure 9:
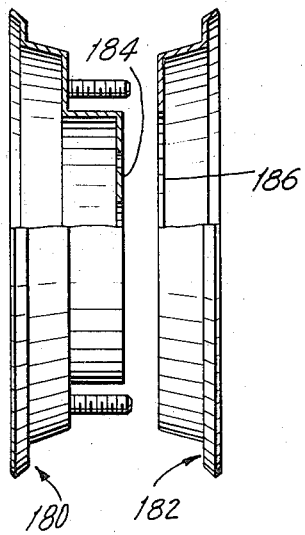

The embodiment of the invention shown in FIG. 9 is identical to that shown in FIG. 8 except that wheel section 182 includes an offset hub portion 184 whereas wheel section 182 includes a flat hub portion 186. The cooperation between hub portions 184 and 186 is as disclosed in FIG. 6. The tire structure suitable for use in FIG. 9 is shown in dotted lines in FIG. 8.

Figure 10:
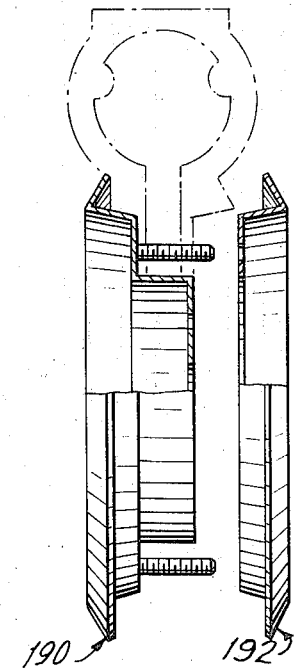

In the embodiment of the invention shown in FIG. 10 the structure shown is identical to that disclosed in FIG. 7 except that wheel sections 190 and 192 each include an inclined rim periphery to accommodate an outer tire which is inclined going from the tire flanks to the bead as shown in dotted lines in FIG. 10. Except as just noted, the complete tire of FIG. 10 is identical to that disclosed in the first embodiment of the invention.

It is to be appreciated that in the embodiments of the invention shown in FIGS. 5 through 10 the complete tire include registered bolt holes as disclosed in the first embodiment of the invention and are identical to the tire structure of the first embodiment of the invention except where specifically disclosed to the contrary. The method of manufacturing the complete tire of FIGS. 5 through 10 is as previously disclosed. Additionally, the wheel sections are as previously disclosed and accept the complete tire as previously disclosed except where stated to the contrary.

If desired the studs of the hub may be used to assemble the tire and wheel by having them of a sufficient length so as to extend through the wheel sections and inner and outer tire.

If desired, the complete tire may be assembled at a factory and shipped completely assembled to a retail store.

It thus will be seen that there is provided an improved tire and wheel combination which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. An improved tire and wheel combination comprising a wheel assembly which is adapted to be mounted on a vehicle wheel hub, said wheel assembly including two wheel sections, said wheel sections including a plurality of registered bolt clearance holes, a tire having a tread and in contact with said wheel sections, a one piece solid unitary structure tire core received within said tire and formed from a resilient material, a plurality of registered bolt clearance holes extending through said tire and said core and in registry with registered bolt clearance holes in said wheel sections, a plurality of bolts, each bolt passing through registered bolt clearance holes in said wheel sections, said tire and said core, a nut for locking the free end of each bolt, a plurality of spaced-apart cavities being located on said core, projections extending from said tire inwardly and each projection positioned within a cavity on said core and filling said cavity whereby said projection and cavity assist in preventing relative movement between said tire and said core.

2. A tire and wheel combination according to claim 1 wherein each wheel section includes a central hub portion with said hub portions of said wheel sections being in face-to-face contact with each other, said wheel sections each including a tire flank retainer, said tire including an annular portion and spaced apart radially inwardly extending tire flanks, said core including an annular section received in the annular portion of said tire and including a radially inwardly extending portion, said tire flanks being located adjacent opposed portions of said radially inwardly extending portion of said core and secured by said tire flank retainers, said tire flanks and said radially inwardly extending portion of said core each having an inner periphery, said wheel sections defining means against which said inner peripheries of said tire flanks and said core abut.

3. A tire and wheel combination according to claim 1 further including a rim periphery on each wheel section extending away from the tire flank retainer thereof with a portion of said tire abutting against each rim periphery, said tire including an external bead on opposed sides thereof and a bead receiver integral with each of said wheel section rim peripheries with each bead of said tire being received in a respective bead receiver.

* * * * *